Figures 1, 2, 3:
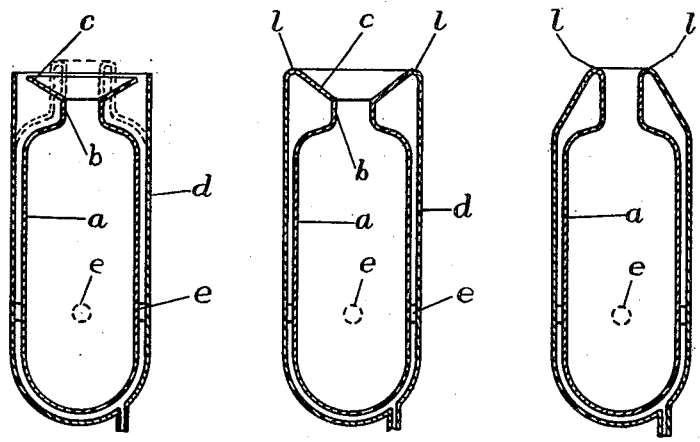

June 19, 1928.

F. SIEGHEIM 1,674,182

MANUFACTURE OF DOUBLE WALLED GLASS VESSELS

Filed Sept. 15, 1926

Inventor:
F. Siegheim
By Chatwin & Company
ATTYS.

Patented June 19, 1928.

1,674,182

UNITED STATES PATENT OFFICE.

FRITZ SIEGHEIM, OF BERLIN, GERMANY.

MANUFACTURE OF DOUBLE-WALLED GLASS VESSELS.

Application filed September 15, 1926, Serial No. 135,667, and in Germany August 30, 1926.

The invention relates to the manufacture of double-walled glass flask-shaped vessels, generally known as Dewar or vacuum flasks, its object being to overcome disadvantages to which present-day method of producing such flasks are subject, and so to provide flasks of very high quality.

In one known method the inner and outer shells or vessel portions are formed and placed one within the other and then melted together at the upper rim, the bottom of the outer vessel being finally finished off. This process is costly, necessitating repeated heating, working and annealing, the flasks produced generally having comparatively weak walls, subject to internal stresses, and a considerable number are wasted by breaking in manufacture.

These disadvantages have been partly overcome in another method wherein a hollow glass body is blown in a mould to the form of the outer vessel, a heavy dome of glass being left, and subsequently sunk within the outer vessel and mechanically shaped to form the inner vessel, that is to say the inner wall of the finished flask. This is successful in so far as the outer wall has uniformity of structure and any desired thickness, although the inner wall is apt to suffer non-uniformity in the mechanical working, if this is not carefully performed, but the further serious disadvantage arises in that it is impossible to insert the usual asbestos supports or spacing pieces between the inner and outer walls, so that if the flask is jarred, as by falling on its side, the whole of the inner portion acts as a cantilever supported at the neck or rim, at which place fracture occurs.

If however, the inner and outer vessel portions are first completely blown in separate moulds, then inserted one within the other, after introducing the spacing pieces they can be melted together at the upper rims to complete the flask, which is thus of uniform thickness throughout the body, has the inner portion adequately supported, and entails comparatively little working and reheating, with corresponding absence of internal stresses.

Even this last mentioned process is not so satisfactory as might be desired, owing to the fact that upon heating the upper parts of the inner and outer portions to the necessary softening temperature for amalgamation, their rims tend to fall inwardly. Thus in order to melt the two together, the inwardly fallen rim of the inner vessel must be worked in a heated condition and turned outwardly, calling for much manipulation by the glass worker upon whose skill the form and thickness of the rim portion of the finished flask depends. Also, the join coming at the rim, this is often naturally weak at this highly stressed part. Further the neck portions of the flasks constantly vary in height and internal diameter, which renders it difficult to obtain proper fitting corks therefor, as is essential for such flasks to be satisfactory in use.

The present invention seeks to overcome all the above mentioned difficulties in the manufacture of such double-walled vacuum flasks and with this end in view, an essential feature of the invention consists in forming the inner vessel with a neck portion which is substantially shorter than the neck of the finished flask, so that after melting together the upper rims of the vessels inserted one within the other, the neck is uniformly drawn out or worked to the correct length and form. In this way internal stresses due to the fusion are substantially removed and greater homogenity of structure obtained.

According to the preferred method of manufacturing the flasks according to the invention, the inner vessel is formed with an enlargement at its upper end, this providing the material for the rim of the flask, and so enabling the place of the fusion to lie upon the outer side of the double-neck and substantially below the rim, where it can be protected in use by the usual metal casing. Further, in order to obtain the finished form of the neck, and to ensure that all the flasks will be of an exact size and shape, a mould is provided comprising a base having a mandrel for insertion in the neck and radially movable side portions conforming to the desired shape of the exterior of the neck. The neck of the flask is worked in this mould, being preferably rotated and blown gently to exactly fill the mould and so acquire precisely the desired shape and size.

In order that the invention may be clearly understood and readily carried into practice I have appended hereto the accompanying sheet of drawings illustrating same, and wherein:—

Figures 4, 5:
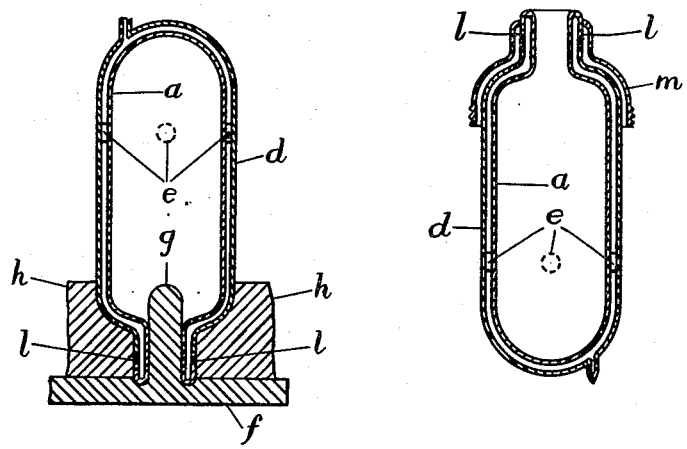

Figure 1 shows more or less diagrammatically, the inner and outer vessels before fusing together, the final form of the flask being indicated by dotted lines; Figs. 2 and 3 show subsequent stages of the process; Fig. 4 shows the final shaping of the neck in a mould, and Fig. 5 represents the finished flask, in which the join is protected by the upper part of the usual metal casing.

In carrying out the manufacture the inner vessel *a* is first blown in a mould, the neck portion *b* being substantially cylindrical and of substantially the same diameter but shorter than the desired neck of the flask when finished. This neck at its outer end carries a flaring or funnel-shaped part *c*, the outer end of which may approximate the diameter of the body of the inner vessel. The outer vessel *d* is also blown in a mould so as to provide a plain cylindrical vessel having a finished bottom, this being much stronger than if the bottom is finished by drawing-out and blowing at a later stage as is the more usual practice.

The vessel *a* is then inserted within the vessel *d* and asbestos pieces *e* are introduced therebetween to support the inner vessel and position it securely within the outer vessel. The upper rims of the two vessels are reheated until they attain a molten or plastic condition, at which the rim of the outer vessel tends to turn inwardly and that of the inner, outwardly, and there is no difficulty in joining the two, as shown in Fig. 2. Preferably the flask is held in tongs and placed upon a rotary spindle while the joining is effected, and the end portion of the flask is then worked in a heated condition until the neck is roughly shaped as shown in Fig. 3 which shape it will tend to assume owing to its own weight. This involves a contraction of the funnel-shaped part *c* until the latter forms an extension of the cylindrical neck part *b* and is substantially or more nearly cylindrical. At the same time the edge portion is turned outwardly and downwardly to cause the joint between the inner and outer vessels to be disposed at the outside of the neck of the finished flask substantially below the rim of the vessel.

When the flask has acquired the shape shown in Fig. 3, it is gradually lowered in an inverted position upon a mould or form comprising a base *f* having a vertical mandrel *g* adapted to enter the neck of the flask and side walls or jaws *h* shaped to the final form of the exterior of the neck and movable radially of the mandrel *g*. The spindle upon which the flask is rotated is disposed vertically above and co-axial with the mandrel *g*, and as the flask descends, the radial jaws are also brought into play, so that the neck portion of the flask is shaped both internally and externally. Naturally, if desired the mould could be rotated and the flask held stationary.

The movement of the jaws and the travel of the rotary spindle are limited by suitable means, for example, adjustable stops or the like, thereby assuring that any number of flasks may be treated in exactly the same manner. The arrangement is such however that when the flask cannot enter further into the mould as above described, it still does not quite fill it, a slight space being left between the extremity of the rim of the flask and the bottom of the mould, i. e. where the mandrel *g* adjoins the base *f*. The shaping of the flask is completed by blowing into the space between the inner and outer vessels, so that the form or mould which is provided by the mandrel *g* base *f* and jaws *h* is exactly filled as shown in Fig. 4.

In this way it is evident that any number of flasks may be made with exactly similar dimensions, and with very little residual internal stresses. The latter are readily removed in the final annealing and the proportion of scrap will be exceedingly small.

The approximate position of the "join" or place where the inner and outer vessels are melted together is indicated at *l* in Figs. 2 to 5, and it is evident that by the method of manufacture above described this join will not be at the naturally weakest part of the finished flask i. e. the rim, but will lie upon the outside of the neck somewhat below the rim, where it is protected by a part of the metal casing *m* with which these flasks are usually fitted in use, the material of the rim itself being entirely provided by the original flange portion *c*.

Flasks so manufactured from "steel glass" may have a uniform thickness of approximately 2 mm. throughout, and will stand exceedingly rough treatment or even dropping upon the floor without breaking, the metal casing being practically dispensable.

I claim:

1. The method of forming a double-walled glass vacuum flask which includes inserting a glass vessel having a short neck and a flaring or funnel-shaped flange at the outer end thereof, within a second substantially cylindrical glass vessel, melting together the free edges of the wall of said outer vessel and said flange, and thereafter contracting the melted together parts, whereby a neck is formed on the outer vessel, the flaring flange of the inner vessel becomes a cylindrical extension of the neck of the latter and outer edge is turned outwardly and downwardly to cause the joint between the inner and outer vessels to be disposed on the outside of the neck of the finished flask and substantially below the rim.

2. The method of forming a double-walled glass vacuum flask which includes inserting a glass vessel having a short neck and a flaring or funnel-shaped flange at the outer end thereof, within a second substantially cylindrical glass vessel, the diameter of said flange being approximately equal to the diameter of said outer vessel, melting together the free edges of the wall of said outer vessel and said flange, and thereafter contracting the melted together parts to form a cylindrical neck portion on the outer vessel and to cause a portion of said flange to form an extension of the neck portion of the inner vessel.

3. The method of forming a double-walled glass vacuum flask which includes forming an inner vessel with a neck portion which is shorter than the desired neck of the finished flask, and with an outwardly extending flange the edge of which approximates the diameter of the body of the vessel, inserting said inner vessel in a cylindrical outer vessel, melting together the free edges of said vessels, and thereafter compressing the flask to form a neck, and thereby causing a portion of said flange to form an extension of the neck of the inner vessel, and a portion to form the rim with the joint between the inner and outer vessels disposed on the outside of the neck of the finished flask and substantially below the rim.

4. The method of forming a double-walled glass vacuum flask which consists in inserting within a cylindrical outer vessel an inner vessel having a neck portion which is shorter than the desired neck of the finished flask, and has an annular flange at its outer end, melting together the free edges of the walls of said vessels, compressing the flask to cause a portion of said flange to form an extension of the neck of the inner vessel, and a portion to be turned outwardly and downwardly to form a portion of the outside wall of the neck of the finished flask, and delivering compressed air between the inner and outer vessels to elongate the neck.

5. The process of forming a double-walled glass vacuum flask which includes forming the neck portion of an inner vessel shorter than the neck of the finished flask, forming a funnel-like flange on the neck of the inner vessel, inserting said inner vessel within an outer vessel, bending inwardly the edge of the outer vessel to meet and unite with the edge of said flange, compressing the flask to form a neck of predetermined internal and external diameter, and applying compressed air between the inner and outer vessels to elongate the neck to a predetermined length with the joint between the inner and outer vessels on the outside of the neck of the flask and below the rim thereof.

FRITZ SIEGHEIM.